US006856341B2

(12) United States Patent
Suzuki

(10) Patent No.: US 6,856,341 B2
(45) Date of Patent: Feb. 15, 2005

(54) VIEWPOINT DETECTING APPARATUS, VIEWPOINT DETECTING METHOD, AND THREE-DIMENSIONAL IMAGE DISPLAY SYSTEM

(75) Inventor: Masahiro Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 604 days.

(21) Appl. No.: 09/812,677

(22) Filed: Mar. 21, 2001

(65) Prior Publication Data

US 2002/0101506 A1 Aug. 1, 2002

(30) Foreign Application Priority Data

Jan. 31, 2001 (JP) ........................................ 2001-024366

(51) Int. Cl.[7] .............................................. H04N 13/00
(52) U.S. Cl. ......................................................... 348/51
(58) Field of Search ............................ 345/420; 348/42, 348/46–59; 359/462; 382/154; H04N 13/00

(56) References Cited

U.S. PATENT DOCUMENTS

| | | | | |
|---|---|---|---|---|
| 5,825,456 A | * | 10/1998 | Tabata et al. ................. | 348/51 |
| 5,872,590 A | * | 2/1999 | Aritake et al. ................ | 348/57 |
| 6,157,402 A | * | 12/2000 | Torgeson ..................... | 348/42 |
| 6,160,527 A | * | 12/2000 | Morishima et al. ........... | 348/54 |
| 6,400,364 B1 | * | 6/2002 | Akisada et al. ............. | 345/420 |
| 6,445,406 B1 | * | 9/2002 | Taniguchi et al. ............ | 348/51 |
| 2003/0012425 A1 | | 1/2003 | Suzuki et al. | |

FOREIGN PATENT DOCUMENTS

| | | |
|---|---|---|
| JP | 08-314034 | 11/1996 |
| JP | 9-311294 | 12/1997 |
| JP | 10-078563 | 3/1998 |
| JP | 10-232367 | 9/1998 |
| JP | 2000-278716 | 10/2000 |

OTHER PUBLICATIONS

The Pattern Matching Algorithm (For Advanced Users), Matrox Imaging Library Version 5.1 User Guide, pp. 154–155.

"Stereovision Area in Lenticular Plate Three–Dimensional Display", Kazuhiko Yamada, Tsukuba Research Laboratory, Technical Research Institute, Toppan Printing Co., Ltd., "3–D Video," vol. 7, No. 2, pp.4–7m, Mar. 1993.

* cited by examiner

*Primary Examiner*—Richard Lee
(74) *Attorney, Agent, or Firm*—Fitzpatrick, Cella, Harper & Scinto

(57) ABSTRACT

A viewpoint position detecting apparatus respectively detects first position information representing a position with respect to a first direction and second position information representing a position with respect to a second direction using different methods. The methods used to detect the first and second position information have different precisions. The apparatus outputs the first and second position information as the viewpoint position of a subject.

33 Claims, 8 Drawing Sheets

FIG. 8
PRIOR ART
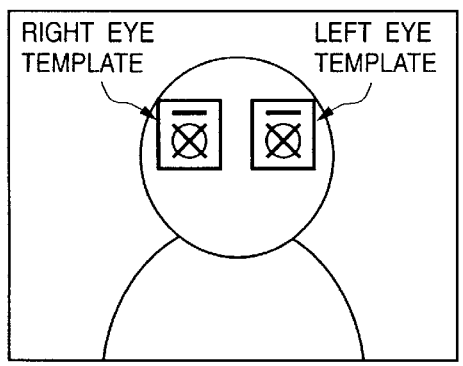
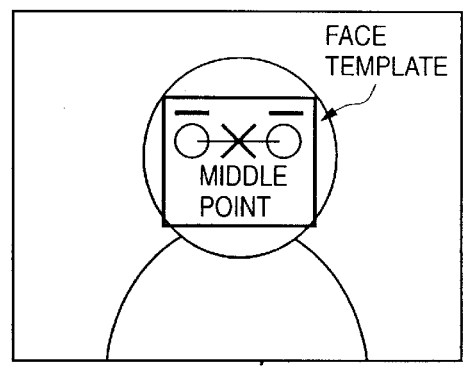
(a) EYE TEMPLATES
(FIRST VISIBLE IMAGE)
(b) FACE TEMPLATES
(FIRST VISIBLE IMAGE)
(X : BASE POINT)

VIEWPOINT DETECTING APPARATUS, VIEWPOINT DETECTING METHOD, AND THREE-DIMENSIONAL IMAGE DISPLAY SYSTEM

FIELD OF THE INVENTION

The present invention relates to a viewpoint detecting apparatus and viewpoint detecting method for detecting the viewpoint of an observer, and in particular, to a viewpoint detecting apparatus and viewpoint detecting method enabling fast processing.

The present invention also relates to an image display apparatus and image display method for displaying a three-dimensional image.

BACKGROUND OF THE INVENTION

Conventionally, a so-called three-dimensional (3-D) image display apparatus is available that enables stereovision by the naked eye. There are a variety of schemes for the 3-D image display. For example, Japanese Patent Laid-Open No. 9-311294 discloses a rear-cross-lenticular scheme apparatus. FIG. 5 is a substantial-part perspective view showing an example of the rear-cross-lenticular 3-D image display apparatus. In FIG. 5, reference number 6 indicates a display device for displaying images, which may be a liquid-crystal display (LCD), for example. In this drawing, a polarizer, color filter, electrode, black matrix, and anti-reflection film, which are generally used in the liquid-crystal display, are omitted.

Reference number 10 indicates a backlight (surface light source). A mask substrate (mask) 7 having checkered openings 8 is provided between a display device 6 and the backlight 10. The mask pattern is provided by patterning deposited metal film such as chromium film or a light absorbent material on the mask substrate 7 made of glass or resin. The backlight 10 and mask substrate 7 form the light source for the 3-D image display apparatus.

Provided between the mask substrate 7 and the display device 6 are a first lenticular lens 3 and a second lenticular lens 4 made of transparent resin, glass, or other material. The first lenticular lens 3 is a longitudinal cylindrical lens array in which vertically elongated cylindrical lenses are arranged in the horizontal direction of the display. The second lenticular lens 4 is lateral cylindrical lens array in which horizontally elongated cylindrical lenses are arranged in the vertical direction of the display.

An image displayed on the display device 6 consists of a large number of horizontal stripe images L1 . . . n, R1 . . . n (where n is a predetermined natural number) formed by vertically dividing each of the entire right and left parallax images (not shown). These stripe images are alternately arranged in a manner, L1R1L2R2L3R3 . . . LnRn from top to bottom, for example, and displayed on the same display screen of the display device 6.

Light from the backlight 10 passes through the openings 8 in the mask pattern formed on the mask substrate 7 to illuminate the display device 6 and the right and left stripe pixels L, R are observed by the eyes of an observer.

That is, the mask substrate 7 is illuminated by the backlight 10 and the light is projected through the openings 8 of the mask pattern. Each of the cylindrical lenses making up of the first lenticular lens 3 positioned on the observer's side of the mask substrate 7 has such a lens curvature that its focal point is substantially on the mask substrate 7. Because the second lenticular lens 4 has no optical effects on the cross-section of the first lenticular lens, a beam of light projected through one opening 8 is transformed into a substantially parallel light beam in the first lenticular lens.

The width of openings 8 and light shielding portions in the mask pattern 7 is chosen so that a pair of the opening 8 and light shielding portion is equivalent to one pitch (the center distance between adjacent cylindrical lenses).

It can be ensured that the light from the openings 8 across the screen converges on the left or right eye by determining the pitch of the first lenticular lens 3 and the pitch of the pair of the opening and light shielding portion of the mask pattern based on the relation between the optical distance from the observer to the first lenticular lens 3 and the optical distance from the first lenticular lens 3 to the mask pattern 7. In this way, the left and right stripe images L1 . . . n, R1 . . . n on the display device 6 are observed in a manner that they are horizontally separated into areas for the left and right eyes.

The second lenticular lens 4 converges all the light beams traveling through the openings 8 of the mask pattern 7 on the stripe images on the display device 6 for the right of left eye to illuminate and transmit it and diverge them only in the vertical direction according to the NA (numerical aperture) at the time of the conversion, thereby providing an observation area where the left and right stripe pixels from top to bottom of the screen are equally and separately seen from a given eye-level of the observer.

However, the stereoscopic view angle of the 3-D image display apparatus is narrow and the 3-D image cannot be recognized when the viewpoint of the observer is out of the stereoscopic view angle. A technology is proposed that detects viewpoint of the observer (subject) and controls the 3-D image display apparatus in response to the movement of the viewpoint, thereby apparently enlarging the stereoscopic view angle. For example, Japanese Patent Laid-Open No. 10-232367 discloses a technology that moves a mask pattern or lenticular lens in parallel to a display surface to enlarge the stereoscopic view angle.

FIG. 6 shows the 3-D image display apparatus disclosed in Japanese Patent Laid-Open No. 10-232367. In FIG. 6, the same reference numbers are applied to the same components as those in FIG. 5 and the description of which will be omitted. The 3-D image display apparatus in FIG. 6 has only a lenticular lens which is equivalent to the first lenticular lens shown in FIG. 5, and does not have a lenticular lens 4 equivalent to the second lenticular lens 4 in FIG. 5.

In the 3-D image display apparatus configured in this way, a view angle control in response to the (horizontal) movement of an observer 54 is performed as follows. First, a position sensor 51 detects a horizontal displacement of the observer 54 from a predetermined reference position and sends information about the displacement to a control unit 512. The control unit 52 sends an image control signal to a display drive circuit 50 according to the displacement information. The display drive circuit 50 causes a first or second horizontal stripe image to be displayed on a display 6. The control unit 52 also generates an actuator drive signal based on the displacement information to drive an actuator 53, which moves a mask pattern 7 horizontally, to move the mask pattern 7 to a position where the observer 54 can best separate left and right stripe images. As a result, the coverage in which stereovision can be achieved is extended.

Japanese Patent Laid-Open No. 10-78563 discloses a method for performing a view angle control that follows the back-and-forth and side-to-side movement of an observer by forming a mask pattern 7 on a liquid-crystal display (LCD), for example, and forming openings and light shielding portions by display presentation to allow the pitch of the openings and light shielding portion to be changed dynamically.

In this case, the viewpoint position of the observer in side-to-side direction and back-and-forth direction must be detected. To determine the position, a method using stereo-vision can be used. Stereo-vision is a known object position determination method in which segment matching (a process of determining correspondence between segments (areas) based on the features of the areas) between a plurality of images captured by a stereocamera is performed to identify a three-dimensional position based on the triangulation principle according to a displacement of corresponding areas between the images.

Although this method extends the area in which stereo-vision can be achieved (the stereovision observation area) by detecting and following the viewpoint of the observer to more the stereovision observation area, the size of the stereovision observation area itself is fixed and the detection process of the viewpoint involves a delay, therefore the viewpoint may go out of the stereovision observation area if the observer moves fast. When the observer goes out of the stereovision observation area, a proper 3-D image cannot be observed. Therefore, there has been a need for a faster detection process for detecting the viewpoint of the observer observing the 3-D image display apparatus.

SUMMARY OF THE INVENTION

The present invention has been made in view of these conventional technical problems and it is an object of the present invention to provide a viewpoint position detecting apparatus, viewpoint point detecting method, three-dimensional image display system, and image display apparatus that allow for a faster detection of the viewpoint position of a subject.

That is, a subject matter of the present invention is a viewpoint position detecting apparatus for detecting and outputting the viewpoint position of a subject, the viewpoint position is represented by a combination of first position information representing a position with respect to a first direction and second position information representing a position with respect to a second direction different from the first direction, the apparatus comprising: first position detecting means for detecting the first position information by using a first method,; second position detecting means for detecting the second position information by using a method different form the first method; and output means for outputting the first and second position information as the viewpoint position; wherein the precision of the second position information is lower than that of the first position information or the detection frequency of the second position information is lower than that of the first position information.

Another subject matter of the present invention is a three-dimensional image display system comprising the viewpoint position detecting apparatus of the present invention and three-dimensional image display means having a stereovision observation area the depth direction of which is longer than the horizontal or vertical direction; wherein the three-dimensional display means comprises light beam control means for generating a light beam incident on the right eye of the subject and a light beam incident on the left eye of the subject by controlling the direction of a light beam emitted from a light source and position control means for moving the position of stereovision observation area by changing the position of the light beam control means based on the viewpoint position of the subject output by the viewpoint position detecting means.

Another subject matter of the present invention is a viewpoint position detecting method for detecting and outputting the viewpoint position of a subject, the viewpoint position is represented by a combination of first position information representing a position with respect to a first direction and second position information representing a position with respect to a second direction different from the first direction, the apparatus comprising: the first position detecting step of detecting the first position information by using a first method; the second position detecting step of detecting the second position information by using a method different form the first method; and the output step of outputting the first and second position information as the viewpoint position; wherein the precision of the second position information is lower than that of the first position information or the detection frequency of the second position information is lower than that of the first position information.

Another subject matter of the present invention is a computer-readable storage medium on which a program is recorded for causing a computer to operate as the viewpoint position detecting apparatus of the present invention.

Another subject matter of the present invention is a program for causing a computer to operate as the viewpoint position detecting apparatus of the present invention.

Another subject matter of the present invention is an image display apparatus comprising: display means for displaying first and second images enabling stereovision; viewpoint position detecting means capable of detecting a viewpoint position in the horizontal direction or vertical direction with respect to an observer a viewpoint position in the depth direction with respect to the observer; and control means for controlling the display status of the first and second images displayed by the display means based on the viewpoint position of the observer detected by the viewpoint position detecting means; wherein the period of detecting the viewpoint position in depth direction with respect to the observer is set so as to be longer than the period of detecting the viewpoint position in the horizontal or vertical direction in the viewpoint position detecting means.

Another subject matter of the present invention is a method for controlling an image display apparatus having display means for displaying first and second images enabling stereovision, comprising a viewpoint position detecting step capable of the detection of a viewpoint position in the horizontal direction or vertical direction with respect to a observer a viewpoint position in the depth direction with respect to the observer; and the control step of controlling the display status of the first and second images displayed by the display means based on the viewpoint position of the observer detected by the viewpoint position detecting step; wherein the period of detecting the viewpoint position in depth direction with respect to the observer is set so as to be longer than the period of detecting the viewpoint position in the horizontal or vertical direction in the viewpoint position detecting step.

Other features and advantages of the present invention will be apparent from the following description taken in conjunction with the accompanying drawings, in which like reference characters designate the same or similar parts throughout the figures thereof.

BRIEF DESCRIPTION OF THE INVENTION

The accompanying drawings, which are incorporated in and constitute a part of the specification, illustrate embodiments of the invention and, together with the description, serve to explain the principles of the invention.

FIG. 8 is a diagram illustrating how template are created.

DETAILED DESCRIPTION OF THE PREFERRED EMBODIMENTS

Preferred embodiments of the present invention will now be described in detail in accordance with the accompanying drawings.

First Embodiment

While a 3-D image display system will be described below in which a viewpoint position detecting apparatus according to the present invention is connected to a 3-D image display apparatus, the viewpoint position detecting apparatus may be used singly or in combination with any other apparatuses.

The term "viewpoint position" in the present invention means the coordinates of a certain point indicating the position of the eyes of an observer. However, viewpoint position information (which will be described later) output by the viewpoint position detecting apparatus of the present invention is not necessarily the coordinates of one point, instead, it may be information about a certain area. That is, because it may suffice for some applications that the position of the eye as a whole can be roughly identified, any appropriate information may be chosen as the information according to the application of the viewpoint position detecting apparatus of the present invention.

Before describing a specific configuration and operation of the viewpoint position detecting apparatus, the principles of the present invention will be described first. The present invention is a 3-D image display apparatus the shape of the stereovision observation area of which is elongated in the depth direction, like a 3-D image display apparatus using lenticular lenses, characterized in that the viewpoint position detecting precision in the depth direction is made lower than that in the horizontal direction, or the position detecting frequency in horizontal direction is made lower than that in the horizontal direction to reduce processing time required for a viewpoint position detection.

Figure 7:
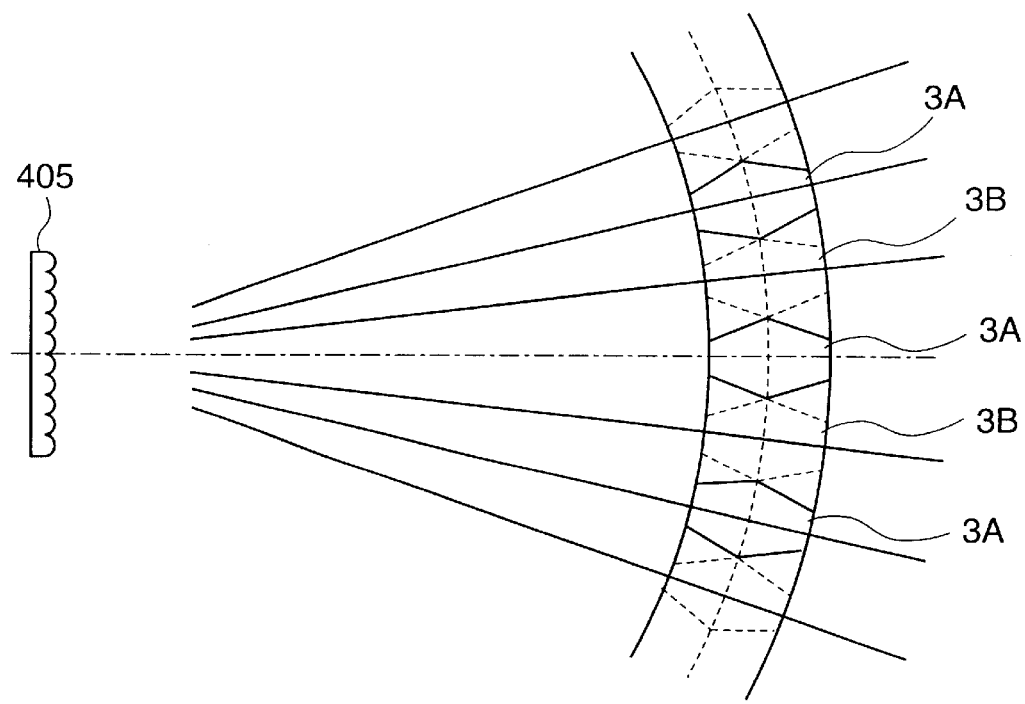
FIG. 7 is a diagram illustrating a stereoscopic image observation area.

The stereovision observation area herein refers to a (normal) stereovision area described in an article entitled "Stereovision Area in Lenticular Plate Three-dimensional Display" by Yamada ("3-D Video" Vol.7, No. 2, pp.4–7, March 1993) (hereinafter called "Document 1"). FIG. 7 shows a diagram illustrating the stereovision area provided in Document 1. Label 3A indicates areas in which proper stereovision can be obtained and 3B indicates areas in which proper stereovision cannot be obtained (reversed stereovision areas in which left and right stripe images are observed to the right and left eyes reversely). From an optimum distance, an observer can observe the left and right stripe pixels equally and separately from top to bottom of a screen from a given eye-level of the observer.

According to Document 1, the stereovision area can be determined by the width of the display screen of a 3-D image display section 405, interocular distance, the number of images, and optimum distance from which stereovision can be obtained. For example, assuming that the interocular distance is 65 mm, the number of images used for providing stereovision is 2, which is a typical number, and the width of the 3-D image display and observation distance are typical values in ordinary practice, the shape of the stereovision area will be a hexagon whose (maximum) distance in depth direction with respect to the display surface is longer than the (maximum) distance in the horizontal direction. The larger the number of the images, the longer the distance of the stereo vision observation area in depth direction becomes.

In other words, a 3-D image display apparatus using lenticular lenses generally provides better performance in depth direction than in horizontal direction with respect to the observer and the a lower precision or frequency of detecting the position of the observer in depth direction than in the horizontal direction is acceptable.

The viewpoint position detecting apparatus according to the present invention exploits this character to perform the detection in horizontal direction every time the detection of the observer's position is performed and the detection in the depth direction is performed with a lower frequency than in the horizontal direction to lower the precision of the detection, thereby achieving a higher speed of the entire detection process.

A specific method for performing the detection in the depth direction with a lower frequency than in the horizontal direction may be to perform a number of detections in the depth direction and a number of directions in the horizontal direction according to a fixed ratio (detection times in horizontal direction>detection times in depth direction). For example, the ratio of the number of detection times in the horizontal direction to that of detection times in the depth direction may be two to one.

Of course, the ratio may not be fixed. Instead, it may be set according to a ratio between the distance of the stereovision observation area in the depth direction and that in the horizontal direction.

Configuration of 3-D Image Display System

Figure 1:
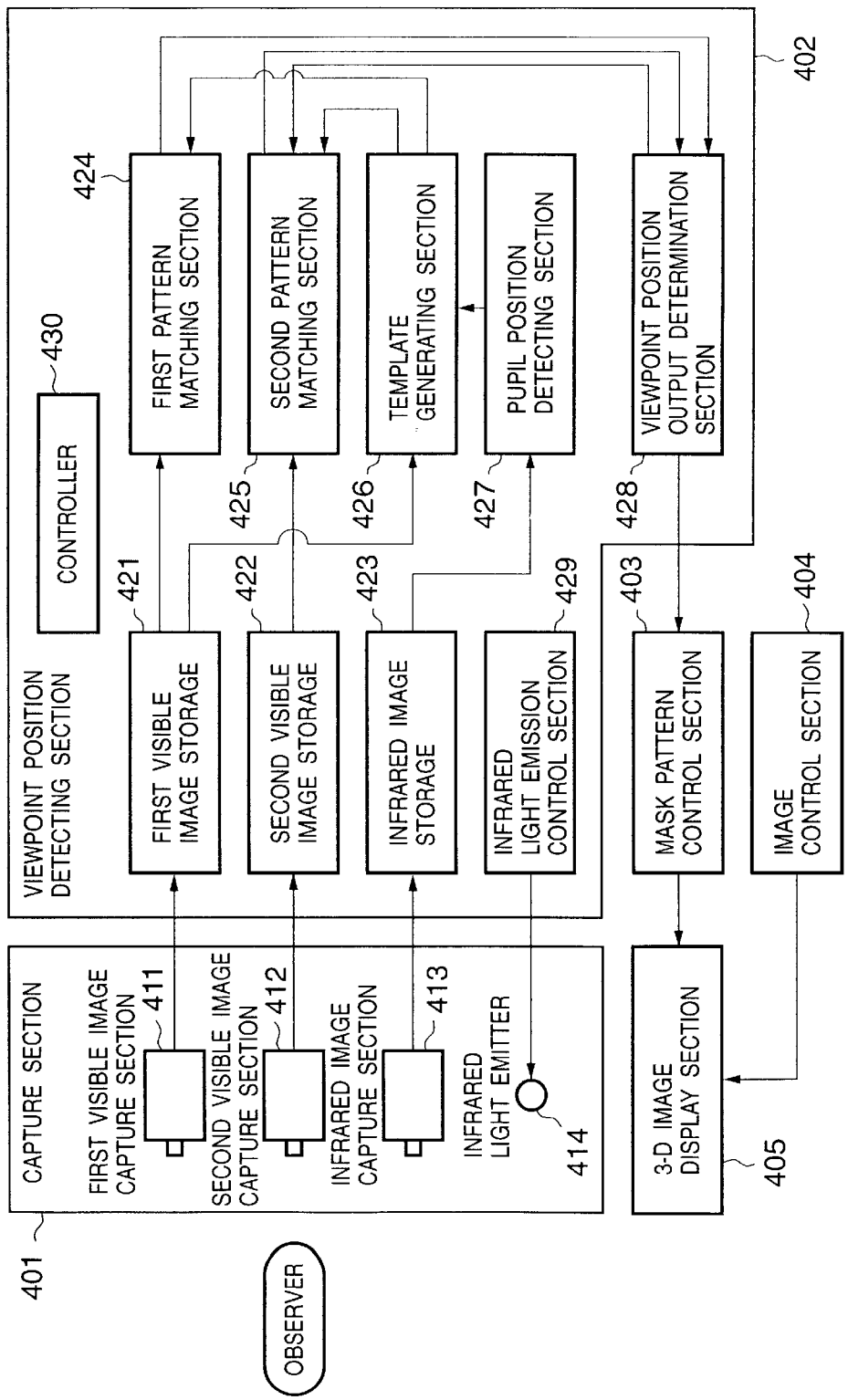
FIG. 1 is block diagram showing an exemplary configuration of a three-dimensional image display system using a viewpoint position detecting apparatus according to a first embodiment of the present invention.
Figure 6:
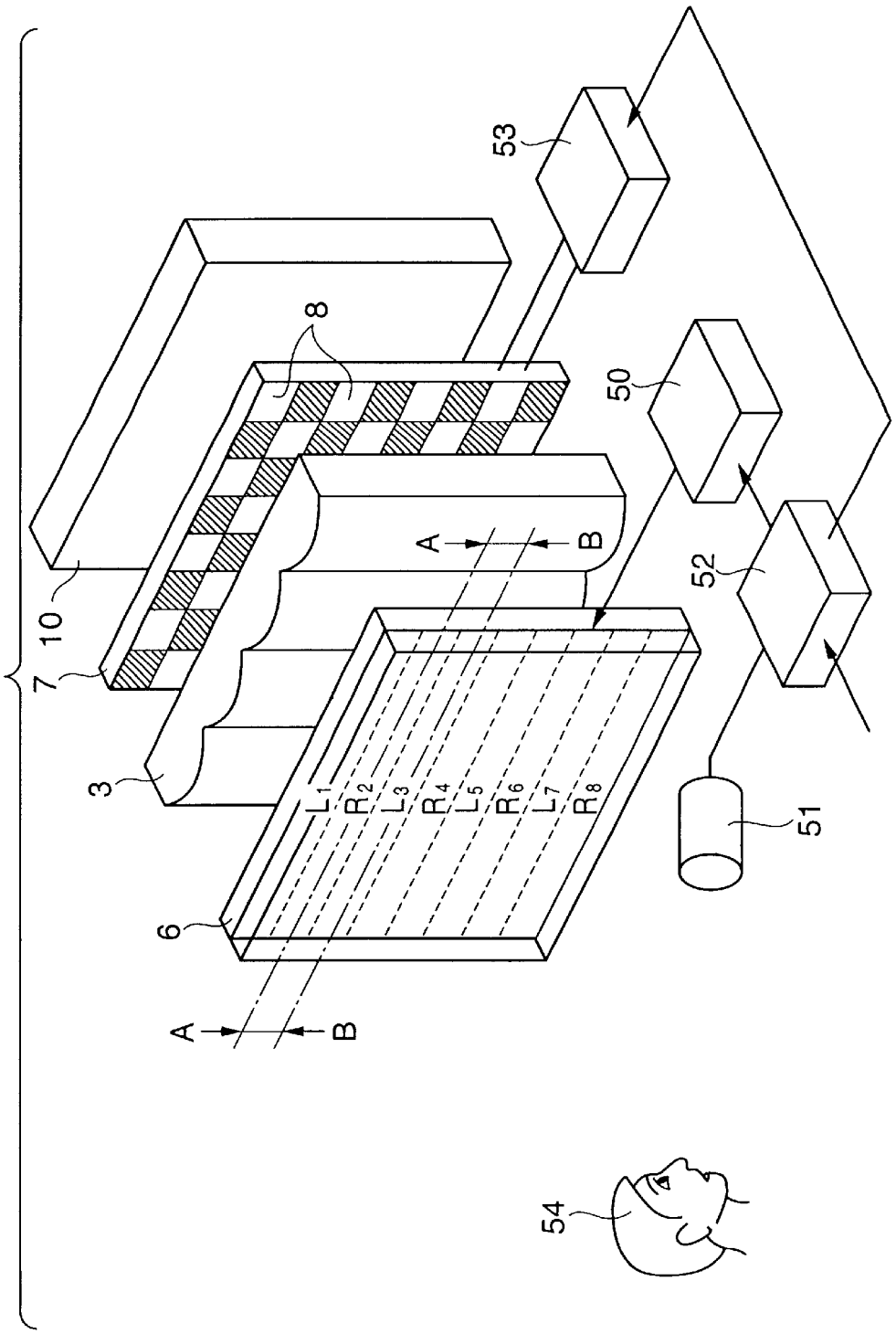
FIG. 6 is a perspective view showing an exemplary three-dimensional image display apparatus for controlling display according to the viewpoint position.

FIG. 1 is a block diagram showing an exemplary configuration of a 3-D image display system using the viewpoint position detecting apparatus according to a first embodiment of the present invention. The viewpoint position detecting apparatus of the present invention in the system shown in FIG. 1 consists of a capture section 401 and a viewpoint position detecting section 402. A 3-D image display section 405 has a configuration equivalent to that of the 3-D image display apparatus described with respect to FIG. 6 (the configuration in which the mask pattern 7 is formed by an LCD and the openings 8 and light shielding portions can be changed dynamically).

A mask pattern control section 403 controls the mask pattern 7 of the 3-D image display section 405. A image control section 404 controls the above-described horizontal stripe images displayed on the 3-D image display section.

The capture section 401 consists of a first visible image capture section 411, second visible image capture section 412, infrared image capture section 413, and infrared light emission section 414 and captures an image visible to the observer and an infrared image. The first visible image capture section 411, second visible image capture section 412, and infrared image capture section 413 can be implemented by capturing means (a video camera and the like) using an imaging device such as a CCD sensor and COMS sensor. The infrared image capture section 413 may have the same configuration as that of the visible image capture sections 411, 412, except that the infrared image capture section uses 413 an optical filter to allow only infrared light to enter the internal imaging device. The first and second visible image capture sections 411 and 412 take a picture of an observer from different position to allow the measurement of the position of the observer in the depth direction based on the images captured by the capture sections by using the above-mentioned stereovision method.

The infrared light emitter 414 may be implemented by an infrared light emitting device such as an LED and configured in a way that an amount of light can be provided that is required for acquiring a retinal reflected image by the infrared image capture section 413 at a normally available distance between the observer (subject) and the capture section 411.

A viewpoint position detecting section 402 consists of a first visible image storage section 421, second visible image storage section 422, infrared image storage section 423, first pattern matching section 424, second pattern matching section 425, template generating section 426, pupil position detecting section 427, viewpoint position output determination section 428, infrared light emission control section 429, and controller 430. The viewpoint position detecting section 402 may be implemented by a general-purpose computer capable of storing image signals output from the capture section 401, for example.

In this case, all of the first visible image storage section 421, second visible image storage section 422, and infrared image storage section 423 for storing image data captured by the first visible image capture section 411, second visible image capture section 412, and infrared image capture section 413 can be implemented by external storage devices such as a magnetic disk drive and optical disk drive. Of course, it may be semiconductor memory or other storage devices.

Any timing with which an image is captured into the image storage section 421 to 423 can be set. However, because the frequency of use of an image captured by the second visible image capture section 412 is lower than that of an image captured by the first visible image capture section 411 as will be described later, the frequency of capture into the second visible image storage section 422 may be lower than that of capture into the first visible image storage section 421. Capture into the infrared image storage section 423 is only needed while the infrared light emitter 414 is emitting light. Image capture through the image capture sections 411 to 413 is performed under the control of the controller 430.

The first pattern matching section 424 uses a template provided from the template generating section 426 to perform pattern matching of images stored in the first visible image storage section 421 and outputs position information about an area having the highest correlation with the template, that is the viewpoint position (in the horizontal direction) information about the observer to the viewpoint position output determination section 428. The first pattern matching section 424 also instructs the infrared light emission control section 429 to cause the infrared emitter 414 to emit light in the case of a pattern matching miss.

The second pattern matching section 425 receives a signal from the viewpoint position output determination section 428 and uses a template provided from the template generating section 426 to perform pattern matching of images stored in the second visible image storage section 422 and, like the first pattern matching section 424, outputs position information about an area having the highest correlation with the template to the viewpoint position output determination section 428 as the viewpoint position (in the horizontal direction) information about the observer.

The template generating section 426 uses the pupil position information of the observer provided from the pupil position detection section 427 to generate from image data stored in the first visible image storage section 411 a template used in the first pattern matching section 424 and the second pattern matching section 425.

The pupil position detection section 427 responds to a signal provided from the infrared light emission control section 429 for indicating the emission of light by the infrared light emitter 414 to detect the pupil position from an infrared image stored in the infrared image storage section 423 to provide the position information to the template generating section 426. That is, the reflection of the infrared light from the human retina is used to detect the position of the pupil from the infrared image of the observer (subject) captured by irradiating the subject with the infrared light.

The viewpoint position output detection section 428 outputs a signal instructing the second pattern matching section 425 to perform pattern matching every predetermined number of times the pattern matching is performed (area position information, which is the result of the pattern matching is output) in the first pattern matching section 424.

When horizontal viewpoint information about the observer is sent from the second pattern matching section 425 (that is, when receiving the viewpoint position information from both of the first and second pattern matching sections 424 and 425), the viewpoint position output determination section 428 determines the viewpoint position in the depth direction of the observer based on the horizontal viewpoint position information by using the above-mentioned stereovision method to output the viewpoint position information in horizontal and depth directions.

According to this embodiment, the second pattern matching section 425 performs the pattern matching every predetermined number of times the first pattern matching section 424 performs pattern matching. Therefore, if the pattern matching have not been performed the predetermined times, the horizontal viewpoint position information is sent only from the first pattern matching section 424. In such a case, the previous depth viewpoint position information calculated is output together with the horizontal viewpoint position information sent from the first pattern matching section 424.

The infrared light emission control section 429 control the light emission by the infrared light emitter 414 under the control of the controller 430, pupil position detecting section 427, and the first pattern matching section 424.

Each component of the viewpoint position detecting section 402 operates under the control of the controller 430. If the viewpoint position detection section is implemented by a computer, the controller 430 is a CPU, and the first and second pattern matching sections 424 and 425, template generating section 426, pupil position detecting section 427, viewpoint position output determination section 428, and infrared light emission control section 429 may be implemented by executing a program stored in a hard disk drive or ROM by the CPU, or may be configured by hardware and implemented by controlling the hardware by the CPU. Of course, it may be a combination of the software configuration and hardware configuration.

Operation of Viewpoint Position Detecting Apparatus

A specific operation of the 3-D image display system shown in FIG. 1 will be described below. Before describing the general operation of the system, an operation of the viewpoint position detecting apparatus of this embodiment by using a flowchart shown in FIG. 2.

First, an activation process such as initialization entailed by the power-on of the capture section 401 and viewpoint position detecting section 402 (step S10). Then, the controller 430 instructs the infrared light emission control section 429 to cause infrared light to be emitted. The infrared light emission control section 429, which receives the instruction, cause the infrared light emitter 414 to emit light (step S11) and indicates the emission of infrared light to the pupil position detecting section 427 and the controller 430.

The controller 430 responds to the indication from the infrared light emission controller 429 to capture a first visible image captured by the first visible image capture section 411, a second visible image captured by the second visible image capture section 412, and an infrared image captured by the infrared image capture section 413 into the first visible image storage section 421, second visible image storage section 422, and infrared image storage section 423, respectively.

In order to generate a precise template and perform precise pattern matching, it is preferable that the images are captured into these storage sections with practically the same timing (in the same frame or field).

The emission of the infrared light may be started automatically after the presence of an observer is detected by a sensor provided for sensing the presence of the observer, for example, or may be started by the observer depressing a start button or any other method.

Next, the pupil position detecting section 427 detects the pupil position from the infrared image stored in the infrared image storage section 423 (step S12). Because human retinas have the characteristic of recursively reflecting infrared light, the infrared light emitted by the infrared light emitter 414 is recursively reflected on the retinas of the observer. Therefore, the retinal reflected image captured on the infrared image is very bright compared with the rest of the image and the position of the retinal reflected image can be identified. In addition, because the position of the retinal reflected image is the same as that of the pupil, the pupil position can be identified consequently.

The detection of the pupil position is accomplished basically by binarizing the infrared image. A process is also performed for calculating the coordinates in the image pointing to a point in the infrared image from the position of the reflected image, because the image reflected on the retinas appears in a portion of the infrared image.

If the pupil position is detected successfully at step S13, the process proceeds to step S14. If the pupil position cannot be properly detected due to the blink of the observer's eyes or some other reasons, the process returns to step S11, where the image capturing is performed again.

If the pupil position is detected successfully at step S13, the generation of templates is started (step S14). FIG. 8 is a diagram illustrating the generation templates. As shown in FIG. 8a, the pupil position detecting section 427 uses the pupil positions of the right and left eyes (coordinates on the image) detected from the infrared image to generate a right eye template with the right pupil position as its base point and a left eye template with the left pupil position as its base point from the first visible image stored in the first visible image storage section 411.

The size of the templates shown in FIG. 8a is calculated by the following equation using the distance between right and left pupil positions, for example.

Distance between the right and left pupil positions of an average human: measured distance between the right and left pupil positions=size of an area into which one eye and eyebrow of the average human fit: size of the eye template.

Alternatively, a face template may be generated which the entire face fits into by using the middle point between the right and left pupil position as its base point as shown in FIG. 8b, in order to perform pattern matching in stages.

The size of the face template is determined by the following equation using the distance between the right and left pupil positions, for example.

Distance between the right and left pupil positions of an average human: measured distance between the right and left pupil positions=size of an area into which the face of the average human fits: size of the face template, where the average value of the area into which one eyes and eyebrow fit and the size of the area into which the entire face fits may be values calculated statistically, for example.

The templates generated by the template generating section 426 is provided to the first pattern matching section 424 and the second pattern matching section 425.

After the completion of the template generation, the viewpoint position output determination section 428 determines whether or not the pattern matching is the predetermined number of times (step S15). If the viewpoint position output determination section 428 determines that the pattern matching has not been performed the predetermined number of times, the process proceeds to step S16 and if it determines that the pattern matching has been performed the predetermined number of times, the process proceeds to step S18, except when step 14 is performed immediately after step S15, in which case the process always proceeds to step S18. When the process proceeds to step S18, the count of the pattern matching is reset to zero and performs step S16 until the predetermined number of times is reached.

If it is determined that pattern matching has not been performed the predetermined times, the pattern matching is performed by using the first visible image stored in the first visible image storage section 421 and the above-mentioned eye template (step S16). The first pattern matching section 424 performs the pattern matching. The pattern matching may be performed by using a normalized correlation function, for example. Pattern matching using a normalized correlation function is described in "Matrox Imaging Library Version 5.1 User Guide" (pp.154–155), for example. A value yielded by the normalized correlation function is expressed as a percentages ranging from 0 to 100%, where 100% represents a perfect match.

In this embodiment, a correlation over 85%, for example, is obtained, the pattern matching is assumed to be successful. Pattern matching performed immediately after the generation of a template essentially should yield a correlation of 100% because the image from which the template is generated is the same as the image data on which pattern matching is performed. The pattern matching in some cases is also called template matching.

If the result of the pattern matching of the template with the first visible image satisfies a predetermined correlation, it is determined that the pattern matching is successful at step S17 and process proceeds to step S21. On the other hand, if the correlation does not satisfy the predetermined value, the template may have to be re-generated. Therefore the process returns to step S11 and the process is performed again.

In order to perform pattern matching in stages, the above-described face template may be used into which the entire face fits. To perform pattern matching in stages, pattern matching of the face template with the first visible image is first performed to detect the approximate position of the observer. Then, based on the result of the pattern matching using the face template, pattern matching of an eye template with the first visible image is performed to detect the viewpoint position of the observer. The pattern matching is performed in this way to narrow the search area in a step-by-step manner, thereby preventing the detection of a wrong viewpoint position (this is not a miss) and allowing a precise tracking.

If it is determined that the pattern matching is performed the predetermined times, pattern matching of the first visible image stored in the first visible image storage section 421 with the above-mentioned template and pattern matching of the second visible image stored in the second visible image storage section 422 with the above-mentioned template are performed (step S18). The same method of the pattern matching as at step S16 is used for each of the first and second visible images.

The template is generated from the first visible image captured by the first visible image capture section 411 and different from the second visible image captured by the second visible image capture section 412. However, this causes no problem because the distance between first visible image capture section 411 and the second visible image capture section 412 is not so long in this embodiment.

If the result of the pattern matching of the template with the first visible image and the result of the pattern matching of the second visible image satisfy the predetermined correlation (for example, 85%), it is determined that the pattern matching is successful at step 19 and the process proceeds to step S20. On the other hand, if the correlation does not satisfies the predetermined value, the template may have to be re-generated. Therefore the process returns to step S11 and the process is performed again.

If the pattern matching is successful, the results of the pattern matching of the first visible image and the pattern matching of the second visible image are used to detect the viewpoint position in the depth direction using stereovision (step 20). Conventionally, it would be problematic to find corresponding points between a plurality of images in a stereo vision. Such a problem is not posed in this case because the common template as described above is used in the pattern matching of the first image and the pattern matching of the second image.

After the completion of the process at step S17 or step S20, the viewpoint position output determination section 428 outputs information about the viewpoint position of the observer (step S21). After the viewpoint positions in depth direction and horizontal direction with respect to the observer are detected successfully at step 20, the viewpoint position information in depth direction and horizontal direction with respect to the observer is output. After the viewpoint position in horizontal direction with respect to the observer is detected successfully at step S17, the result of the viewpoint position detection in the depth direction obtained previously is used as the viewpoint position in the depth direction and outputs the information about the depth and horizontal viewpoint positions of the observer. The viewpoint position information output from the viewpoint position output determination section 428 is the viewpoint position information output from the viewpoint position detection section 402. When the viewpoint position information is output from the viewpoint position detection section 402, the mask pattern control section 403 receives the viewpoint position information and control the mask pattern of the 3-D image display section 405.

When the viewpoint position information is output from the viewpoint position detection section 402, it is determined at step S22 whether the system is to be terminated or not. If no instruction to terminate the system operation is issued, a first visible image and second visible image are captured through the first visible image capture section 411 and the second visible image capture section 412 and stored in the first visible image storage section 421 and the second visible image storage section 422, then the process returns to step S15. Then the pattern matching is continued and, if the pattern matching fails, infrared light is emitted automatically to perform a template re-generation process.

If an instruction to terminate the process is issued at step S22, a predetermined termination process is performed (step S23), then the process terminates. In this way, the viewpoint position in depth direction is performed once every predetermined number of times (S15) the detection of the viewpoint position is performed, thus reducing the number of calculations to be reduced and allowing the process to be performed faster.

Second Embodiment

The first embodiment has been described in which a fixed ratio between the number of times of the detection in the horizontal direction and that of the detection in the depth direction is set (detection times in horizontal direction>detection times in depth direction) to decrease the frequency of the viewpoint detection in the depth direction to a lower value than the frequency of the viewpoint detection in horizontal direction, thereby increasing the speed of the entire viewpoint position detection process. However, in a environment where an observer sits on a chair and does not frequently move backward and forward, the same advantage can be achieved by a configuration in which a switch is provided that can be depressed by the observer, and, when a 3-D image cannot be observed, the observer depresses the switch so that detection in depth direction is performed. This configuration will be described with respect to a second embodiment.

Figure 3:
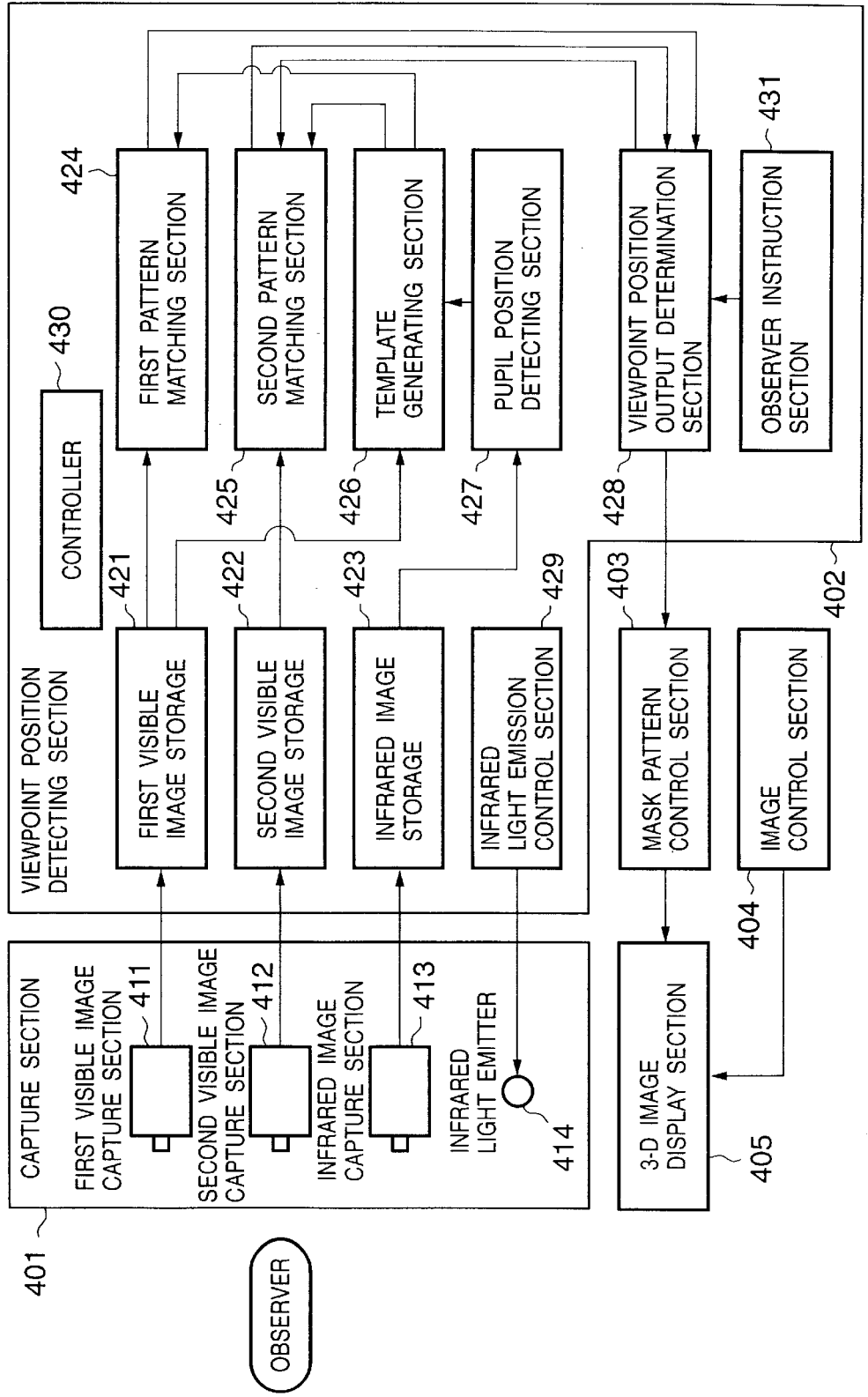
FIG. 3 is a block diagram showing an exemplary configuration of a three-dimensional image display apparatus using a viewpoint position detecting apparatus according to a second embodiment of the present invention.

FIG. 3 is a block diagram showing a configuration of the second embodiment of the present invention. Like the system shown in FIG. 1, a 3-D image display system shown in FIG. 3 is composed of a capture section 401, viewpoint position detecting section 402, mask pattern control section 403, image control section 404, and 3-D image display section 405. In FIG. 3, the same reference numbers are applied to the same components as those of the first embodiment shown in FIG. 1 and the description thereof will be omitted.

This embodiment is different form the first embodiment in that the viewpoint position detecting section 402 has a observer instruction section 431. The observer instruction section 431 is so-called switch means. When the observer depresses this switch, it is detected that an instruction is issued by the observer. When the instruction is issued by the observer, a signal from the observer instruction means 431 is input into a viewpoint position output determination section 428, which responds to the signal to sends a signal to a second pattern matching section to instruct it to perform pattern matching. Thus, viewpoint position detection in depth direction is performed when instructed by the observer.

Figure 4:
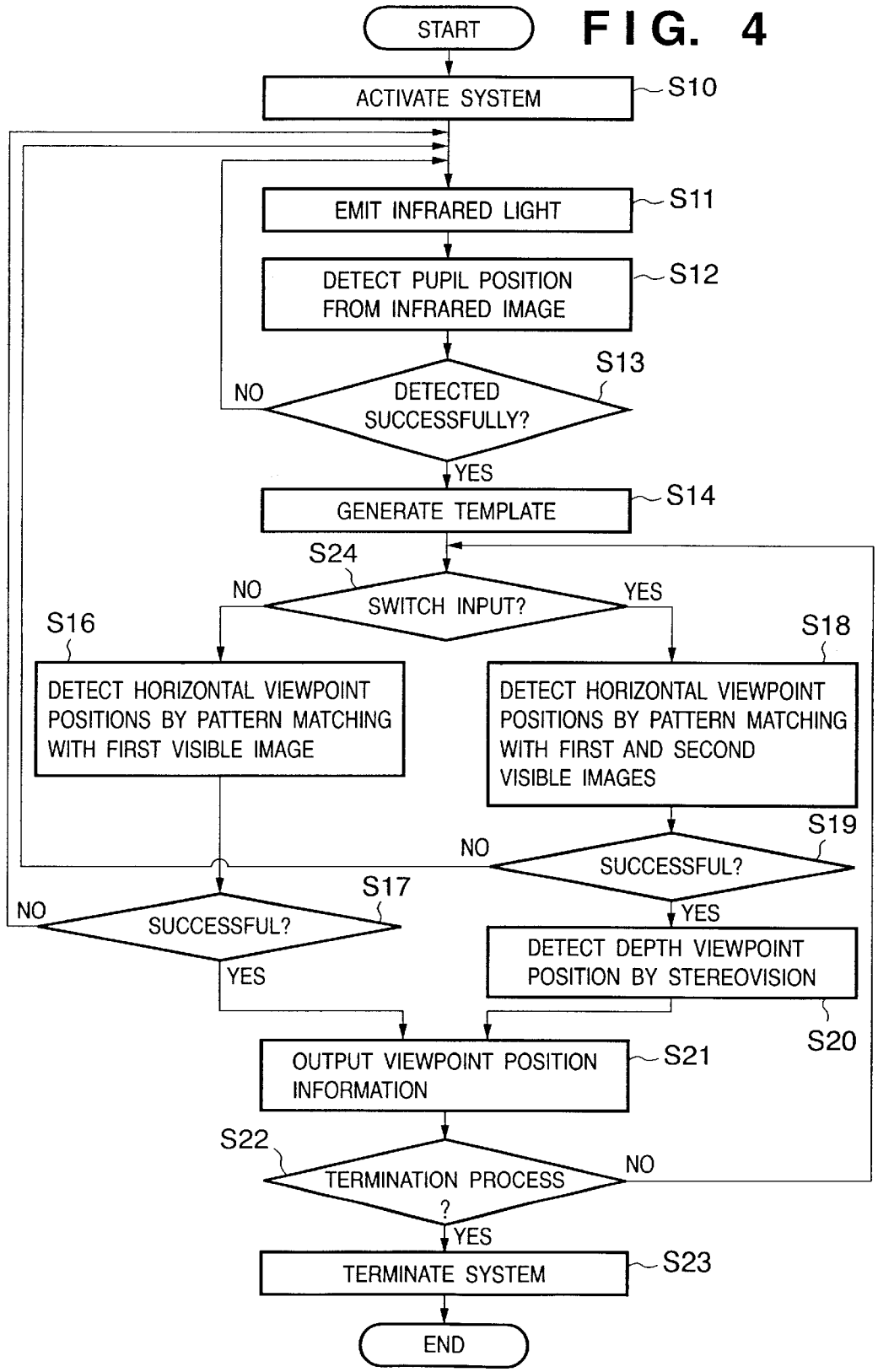
FIG. 4 is a flowchart illustrating an operation of the viewpoint position detecting apparatus according to the second embodiment of the present invention.
Figure 5:
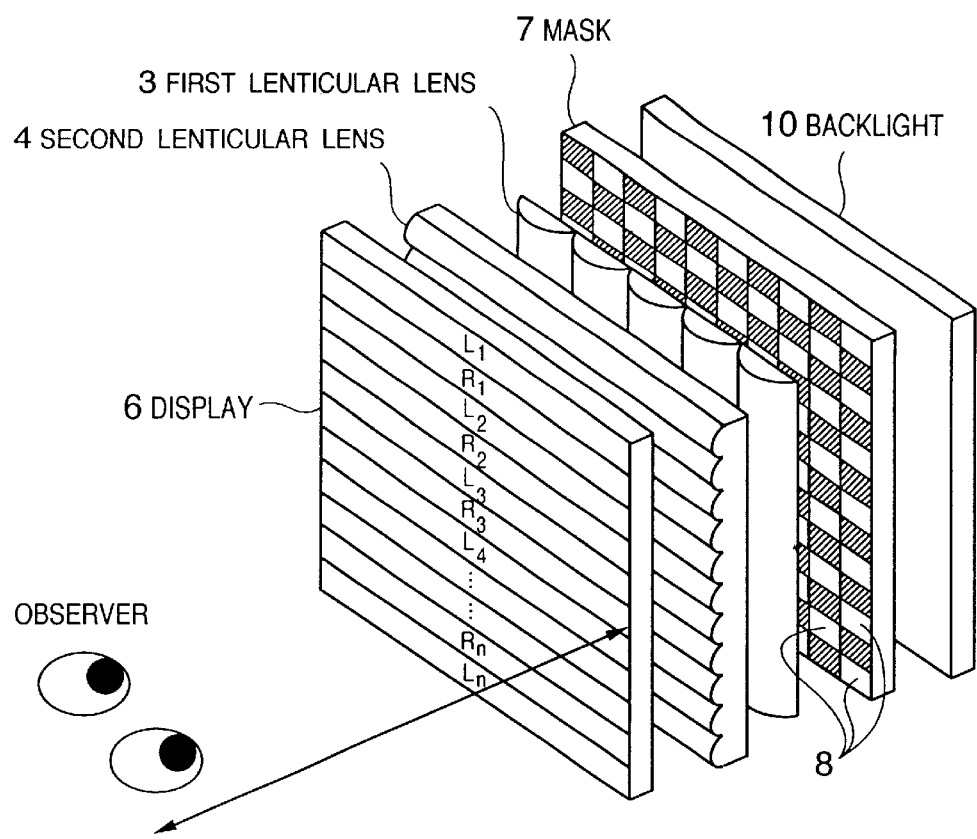
FIG. 5 is a perspective view showing an exemplary configuration of a rear-cross-lenticular three-dimensional image display apparatus according to a prior art.

A specific operation will be described with reference to FIG. 4. FIG. 4 is a flowchart showing an operation according to this embodiment. In FIG. 4, the same reference numbers are applied to steps at which the same operations as those in FIG. 2 and overlapping description of which will be omitted.

Figure 2:
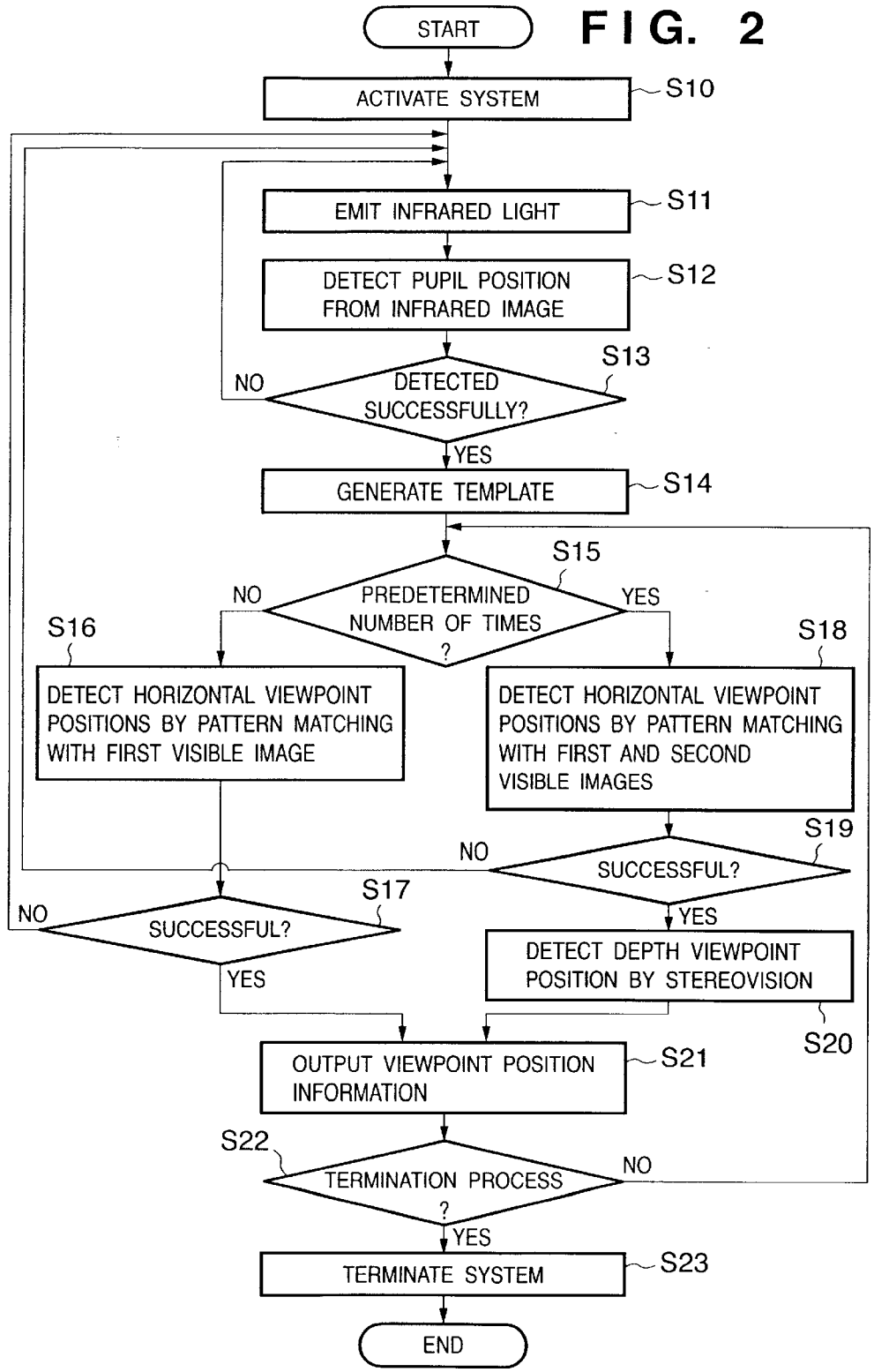
FIG. 2 is a flowchart illustrating an operation of the viewpoint position detecting apparatus according to the first embodiment of the present invention.

As can be seen from FIG. 4, the process steps of this embodiment the same as those shown in FIG. 2 except that a step for determining whether pattern matching is performed predetermined times (step S15) is eliminated and a step S24 is added for detecting the presence or absence of a signal from the observer instruction section 431 to determine whether the instruction by the observer is issued or not.

By adding step S24, it becomes possible that only the horizontal viewpoint position of the observer is detected in normal times and, when instructed by the observer through the observer instruction means 431, the viewpoint position detection in the depth direction and the detection in horizontal direction are performed. As a result, the viewpoint position detection can be performed faster.

While the template is re-generated if pattern matching fails in the above-described embodiments, the same template may be used to perform pattern matching repeatedly until a predetermined number of failures is reached or until the termination process is performed. This can reduce the number of steps for generating templates and enables a faster viewpoint position detection.

The amount of light emission may be changed depending on the brightness of the 3-D image display section 405 or the distance from the 3-D image display section 405 to the observer when infrared light is emitted, or the amount of light emission may be changed (increased or decreased) from the previous one if pupil position detection from an infrared image fails and is re-attempted in the above-described embodiments. Controlling the light emission in this way increases the probability of success in pupil position detection from the infrared image, resulting in a faster viewpoint position detection.

Alternatively, the brightness of the 3-D image display section 405 may be changed when the infrared light is emitted in the above-described embodiments. For example, because the pupil of the observer dilates when the brightness is decreased, the probability of success in the pupil position detection from the infrared image is increased, resulting in a faster viewpoint position detection.

While the embodiments has been described with respect to the application in which the result of detection by the viewpoint position detecting apparatus according to the present invention is displayed on the 3-D image display apparatus, as an example, the viewpoint position detecting apparatus according to the present invention may also be used for any other applications.

Methods such as the methods for pattern matching and template generation are not limited to the specific methods described in the above embodiments. Instead, any equally applicable methods may be used, of course.

While the above-described embodiments are configured so as to output the viewpoint position, which is the coordinates of a pinpoint, the middle position of a template may be output to the image display section 3 because, if the final viewpoint position obtained is used for controlling a 3-D image display apparatus as with the above-described embodiments, a minimum control can be accomplished by detecting the middle point of the viewpoint position between the right and left eyes.

While pattern matching or stereovision is used to detect the viewpoint position in the above-described embodiments, the present invention of course is not limited to methods using the pattern matching or stereovision.

While the above-described embodiments the 3-D image display apparatus using lenticular lenses, as a 3-D image display apparatus (3-D image display section) for which the viewpoint position detecting apparatus can be applied suitably, has been disclosed, any other 3-D image display apparatuses may be used that have a stereovision observation area elongated in the depth direction compared with the horizontal direction.

While in the above-describe embodiments the 3-D image display apparatus using lenticular lenses, as a 3-D image display apparatus (3-D image display section) for which the viewpoint position detecting apparatus can be applied suitably, has been disclosed, the apparatus may be applied to a integral photography system ("fly eye lens" system, in which the lenticular system is used in the vertical direction as well as horizontal direction). In this case, if the system has a stereovision observation area elongated in the depth direction compared with the vertical direction (as well as the horizontal direction), a faster viewpoint position detection can be achieved by reducing the number of processes required for detecting a position in the vertical direction to a number smaller than the number of processes required for detecting a position in the vertical direction.

The essence of the present invention is to achieve a faster viewpoint position detection process by reducing the number of processes required for detecting a position in the vertical direction to a number smaller than the number of processes required for detecting a position in the horizontal or vertical direction. Therefore, the present invention is not limited to the method that changes the frequency of detection as described above with respect to the embodiments. Instead, other methods such as a method in which a position in the depth direction is detected by using a process easier than a process for detecting a position in horizontal or vertical direction.

The present invention may be applied to a system consisting of a plurality of devices (for example, a host computer, interface devices, reader, printer, and other devices) or may be applied to a single apparatus (for example, a copying machine, facsimile, or other apparatuses).

Of course, the object of the present invention may also be achieved by providing a storage medium (or recording medium) on which a software program code implementing functions described above to a system or an apparatus and reading and executing the program code stored in the storage medium by the computer (or, CPU or MPU) of the system or apparatus.

In that case, the program code read from the storage medium implements the functions of the embodiments described above and the storage medium storing the program code constitutes the present invention. The present invention includes the case where the functions of the above-described embodiments are implemented by a computer reading and executing the program code and the case where an operating system (OS) or other systems running on the computer performs a part or all of an actual processes based on the instruction of the program code and the functions of the above-described embodiments are implemented by the processes.

The present invention includes the case where the program code read from the storage medium is written in memory included in a function expansion card inserted in a computer or a function expansion unit connected to the computer, then the CPU or other component contained in the function expansion card or function expansion unit performs part or all of actual processes and the functions of the above-described embodiments are implemented by the processes.

If the present invention is applied to the above-described storage medium, the program code corresponding to the flowchart (shown in FIG. 2 or 4) explained above is stored on the storage medium.

As described above, according to the present invention, a fast viewpoint position detection can be achieved by making the precision or frequency of viewpoint position detection in the depth direction lower than the precision or frequency of viewpoint position detection in the horizontal or vertical direction to reduce the processing load.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the appended claims.

What is claimed is:

1. A viewpoint position detecting apparatus for detecting and outputting a viewpoint position of a subject,
said viewpoint position being represented by a combination of first position information representing a position with respect to a first direction and second position information representing a position with respect to a second direction different from said first direction, said apparatus comprising:
first position detecting means for detecting said first position information by using a first method;
second position detecting means for detecting said second position information by using a method different from said first method; and
output means for outputting said first and second position information as said viewpoint position,
wherein the precision of said second position information is lower than that of said first position information or the detection frequency of said second position information is lower than that of said first position information.

2. The viewpoint position detecting apparatus according to claim 1, wherein said first direction is the horizontal or vertical direction and said second direction is the depth direction.

3. The viewpoint position detecting apparatus according to claim 1, wherein said first position detecting means detects said first position information based on a visible image of the subject captured in a first position.

4. The viewpoint position detecting apparatus according to claim 1, wherein said second position detecting means detects said second position information based on a visible image of said subject captured in a first position and a visible image of said subject captured in a second position different from said first position.

5. The viewpoint position detecting apparatus according to claim 4, wherein said second position information is detected by a stereovision method.

6. The viewpoint position detecting apparatus according to claim 1, wherein the detection process of said first position information is performed periodically and the detection of said second position information is performed only when a predetermined condition is satisfied.

7. The viewpoint position detecting apparatus according to claim 6, wherein said predetermined condition is that the detection process of said first position information is performed a predetermined times.

8. The viewpoint position detecting apparatus according to claim 6, wherein said predetermined condition is that a failure of the detection process of said first position information occurs.

9. The viewpoint position detecting apparatus according to claim 6, further comprising instruction input means, wherein said predetermined condition is an instruction issued through said instruction input means.

10. The viewpoint position detecting apparatus according to claim 1, further comprising:
infrared image capture means for capturing an infrared image of the subject; and
template generation means for detecting the pupil position of the subject from said infrared image and generating a template for viewpoint position detection, wherein said first position detecting means detects said first position information by using pattern matching of said template with a visible image captured from a first position; and
said second position detecting means detects said second position information based on the result of pattern matching of said template with a visible image captured from a second position different from said first position and said first position information.

11. A three-dimensional image display system comprising the viewpoint position detecting apparatus according to claim 1 and three-dimensional image display means having a stereovision observation area elongated in the depth direction compared with the horizontal or vertical direction, wherein, said three-dimensional image display means comprises:
light beam control means for controlling the direction of a light beam emitted from a light source to generate a light beam incident on the right eye of the subject and a light beam incident on the left eye of the subject; and
position control means for changing the position of said light beam control means based on the viewpoint position of said subject output by said viewpoint position detecting apparatus to move the position of said stereovision observation area.

12. A computer-readable storage medium on which a program is recorded for causing a computer to operate as the viewpoint position detecting apparatus according to claim 1.

13. A program for causing a computer to operate as the viewpoint position detecting apparatus according to claim 1.

14. A viewpoint position detecting method for detecting and outputting a viewpoint position of a subject,
said viewpoint position being represented by a combination of first position information representing a position with respect to a first direction and second position information representing a position with respect to a second direction different from said first direction, said method comprising:
a first position detecting step of detecting said first position information by using a first method;
a second position detecting step of detecting said second position information by using a method different from said first method; and an output step of outputting said first and second position information as said viewpoint position, wherein the precision of said second position information is lower than that of said first position information or the detection frequency of said second position information is lower than that of said first position information.

15. The viewpoint position detecting method according to claim 14, wherein said first direction is the horizontal or vertical direction and said second direction is the depth direction.

16. The viewpoint position detecting method according to claim 14, wherein said first position detecting step detects said first position information based on a visible image of the subject captured in a first position.

17. The viewpoint position detecting method according to claim 14, wherein said second position detecting step detects said second position information based on a visible image of said subject captured in a first position and a visible image of said subject captured in a second position different from said first position.

18. The viewpoint position detecting method according to claim 17, wherein said second position information is detected by a stereovision method.

19. The viewpoint position detecting method according to claim 14, wherein said first position detecting step is performed periodically and said second position detecting step is performed only when a predetermined condition is satisfied.

20. The viewpoint position detecting method according to claim 19, wherein said predetermined condition is that the detection process of said first position information is performed a predetermined times.

21. The viewpoint position detecting method according to claim 19, wherein said predetermined condition is that a failure of the detection process of said first position information occurs.

22. The viewpoint position detecting method according to claim 19, further comprising an instruction detecting step of detecting an instruction from the subject, wherein said predetermined condition is the detection of the instruction from the subject by said instruction detecting step.

23. The viewpoint position detecting method according to claim 14, further comprising:

an infrared image capture step of capturing an infrared image of the subject; and a template generation step of detecting a pupil position of the subject from said infrared image and generating a template for viewpoint position detection, wherein said first position detecting step detects said first position information by using pattern matching of said template with a visible image captured from a first position; and said second position detecting step detects said second position information based on the result of pattern matching of said template with a visible image captured from a second position different from said first position and said first position information.

24. A image display apparatus comprising:

display means for displaying first and second images enabling stereovision;

viewpoint position detecting means capable of detecting a viewpoint position in the horizontal direction or vertical direction with respect to an observer and a viewpoint position in the depth direction with respect to the observer; and control means for controlling the display status of said first and second images displayed by the display means based on the viewpoint position of the observer detected by said viewpoint position detecting means;

wherein the period of detecting the viewpoint position in depth direction with respect to the observer is set so as to be longer than the period of detecting the viewpoint position in the horizontal or vertical direction in said viewpoint position detecting means.

25. The image display apparatus according to claim 24, wherein said display means comprises viewpoint position changing means for changing the optimum viewpoint position for stereovision and said control means controls said viewpoint position changing means based on an output from said viewpoint position detecting means to control said optimum viewpoint position.

26. The image display apparatus according to claim 25, wherein said display means is a lenticular display having a first display area for displaying said first image and a second display area for displaying said second image and said viewpoint position changing means is means for changing the position of a mask substrate causing said first image to be displayed on said first display area and causing said second image to be displayed on said second display area.

27. The image display apparatus according to claim 24, wherein said viewpoint position detecting means detects the pupil image of said observer to generate a template and performing a calculation for pattern matching of said template with said pupil image to detect a change in the viewpoint position.

28. The image display apparatus according to claim 24, wherein said viewpoint position detecting means performs said viewpoint position detection in the horizontal or vertical direction for each of said first and second images and performs said viewpoint position detection in the depth direction based on the result of the viewpoint position detection for said first and second images.

29. A method for controlling an image display apparatus having display means for displaying first and second images enabling stereovision, comprising:

a viewpoint position detecting step capable of detecting a viewpoint position in a horizontal direction or vertical direction with respect to an observer and a viewpoint position in a depth direction with respect to the observer; and a control step of controlling a display status of said first and second images displayed by said display means based on the viewpoint position of the observer detected by said viewpoint position detecting step;

wherein the period of detecting the viewpoint position in the depth direction with respect to said observer is set so as to be longer than the period of detecting said viewpoint position in the horizontal or vertical direction in the viewpoint position detecting step.

30. The image display apparatus control method according to claim 29, wherein said display means comprises viewpoint position changing means for changing the optimum viewpoint position for stereovision, and said control step controls said viewpoint position changing means based on an output from said viewpoint position detecting step to control said optimum viewpoint position.

31. The image display apparatus control method according to claim 30, wherein said display means is a lenticular display having a first display area for displaying said first image and a second display area for displaying said second image, and said viewpoint position changing means is means for changing the position of a mask substrate causing said first image to be displayed on said first display area and causing said second image to be displayed on said second display area.

32. The image display apparatus control method according to claim 29, wherein said viewpoint position detecting step detects the pupil image of said observer to generate a template and performing a calculation for pattern matching of said template with said pupil image to detect a change in the viewpoint position.

33. The image display apparatus control method according to claim 29, wherein said viewpoint position detecting step comprises a step of performing said viewpoint position detection in the horizontal or vertical direction for each of said first and second images and performing said viewpoint position detection in the depth direction based on the result of the viewpoint position detection for said first and second images.

\* \* \* \* \*

UNITED STATES PATENT AND TRADEMARK OFFICE
CERTIFICATE OF CORRECTION

PATENT NO. : 6,856,341 B2
APPLICATION NO. : 09/812677
DATED : February 15, 2005
INVENTOR(S) : Masahiro Suzuki It is certified that error appears in the above-identified patent and that said Letters Patent is hereby corrected as shown below:

COLUMN 1
Line 65, "of" should be deleted.

COLUMN 2
Line 6, "is" should read --are--.
Line 43, "of which" should read --thereof--.

COLUMN 3
Line 20, "more" should read --move--.

COLUMN 4
Lines 49-50, "to a observer a viewpoint position in the depth direction with respect" should be deleted.

COLUMN 5
Line 26, "template" should read --templates--.
Line 67, "A" should read --an--.

COLUMN 7
Line 18, "position" should read --positions--.

COLUMN 8
Line 36, "matching" should read --matching,--.
Line 50, "times" should read --times that--.
Line 52, "matching" should read --matchings-- and "control" should read --controls--.

COLUMN 11
Line 44, "satisfies" should read --satisfy--.

COLUMN 12
Line 10, "control" should read --control--.
Line 28, "times" should read --times that--.
Line 42, "in a" should read --in an--.

COLUMN 13
Line 1, "sends" should read --send--.
Line 10, "of which" should read --thereof--.
Line 12, "the" should read --are the--.

UNITED STATES PATENT AND TRADEMARK OFFICE
CERTIFICATE OF CORRECTION

PATENT NO. : 6,856,341 B2
APPLICATION NO. : 09/812677
DATED : February 15, 2005
INVENTOR(S) : Masahiro Suzuki Page 2 of 2

It is certified that error appears in the above-identified patent and that said Letters Patent is hereby corrected as shown below:

COLUMN 14
Line 6, "the 3-D" should read --of the--.
Line 37, "other" should read --there may be used--.
Line 62, "an" should be deleted.

COLUMN 16
Line 8, "times." should read --number of times.--.

COLUMN 17
Line 32, "times." should read --number of times.--.
Line 62, "a" should read --the--.

COLUMN 18
Line 27, "performing" should read --performs--.

COLUMN 19
Line 9, "performing" should read --performs--.

Signed and Sealed this

Thirteenth Day of May, 2008

JON W. DUDAS
*Director of the United States Patent and Trademark Office*